US012583201B2

(12) United States Patent     (10) Patent No.:   US 12,583,201 B2

Alter et al.     (45) Date of Patent:   Mar. 24, 2026

(54) SOUND-ATTENUATING COMPOSITE COMPONENT WITH HONEYCOMB CORE AND PRODUCTION METHOD THEREFOR

(71) Applicant: EURO-COMPOSITES S.A., Echternach (LU)

(72) Inventors: Rolf-Mathias Alter, Echternach (LU); Willy Wintgens, Troisvierges (LU); Alex Hemmerling, Fell (DE); Christian Krawczyk, Hermeskeil (DE); Philipp Buss, Osburg (DE); Bernd Wagner, Ferschweiler (DE); Gilles Rousselot, Luxembourg (LU)

(73) Assignee: EURO-COMPOSITES S.A., Echternach (LU)

( * ) Notice: Subject to any disclaimer, the term of this patent is extended or adjusted under 35 U.S.C. 154(b) by 16 days.

(21) Appl. No.: 18/553,944

(22) PCT Filed: Mar. 23, 2022

(86) PCT No.: PCT/EP2022/057622

§ 371 (c)(1),
(2) Date: Oct. 4, 2023

(87) PCT Pub. No.: WO2022/214316

PCT Pub. Date: Oct. 13, 2022

(65) Prior Publication Data

US 2024/0190102 A1     Jun. 13, 2024

(30) Foreign Application Priority Data

Apr. 9, 2021    (LU) ........................................ 102779

(51) Int. Cl.
*B32B 3/12*       (2006.01)
*B32B 3/28*       (2006.01)
(Continued)

(52) U.S. Cl.
CPC ................. *B32B 3/12* (2013.01); *B32B 3/28* (2013.01); *B32B 7/12* (2013.01);
(Continued)

(58) Field of Classification Search
None
See application file for complete search history.

(56) References Cited

U.S. PATENT DOCUMENTS 9,127,452 B1   9/2015   Winfield et al.
9,607,598 B2   3/2017   Leon et al.
(Continued)

FOREIGN PATENT DOCUMENTS

CN     103915090     7/2014
CN     106328113     1/2017
(Continued)

OTHER PUBLICATIONS

International Search Report from corresponding PCT Appln. No. PCT/EP2022/057622, dated Jul. 7, 2022.
(Continued)

*Primary Examiner* — Elizabeth Collister
(74) *Attorney, Agent, or Firm* — Grossman, Tucker, Perreault & Pfleger, PLLC

(57) ABSTRACT

A sound-attenuating composite component comprising a honeycomb and in each case at least one insert body in at least some honeycomb cells, and a production method therefor. The respective insert body has a main axis, a first end, a second end, and a cohesive surface and is inserted with the main axis in the direction of the honeycomb depth. The cohesive surface has surface regions spaced from one another in the axial direction and which face one another and overlap in a projection onto a plane lying perpendicular to the main axis in order to demarcate a passage for sound waves in the axial direction. The course of the cohesive
(Continued)

surface through these surface regions from the first end to the second end encircles and/or repeatedly crosses the main axis.

26 Claims, 4 Drawing Sheets

(51) Int. Cl.
   B32B 7/12          (2006.01)
   B33Y 80/00         (2015.01)
(52) U.S. Cl.
   CPC ..... *B32B 2307/102* (2013.01); *B32B 2605/18* (2013.01); *B33Y 80/00* (2014.12)

(56) References Cited

U.S. PATENT DOCUMENTS

| | | | | |
|---|---|---|---|---|
| 2008/0020176 A1* | 1/2008 | Ayle | ..................... | G10K 11/172 |
| | | | | 428/118 |
| 2015/0041247 A1 | 2/2015 | Ichihashi | | |
| 2015/0086335 A1 | 3/2015 | Merlo et al. | | |

| | | | | |
|---|---|---|---|---|
| 2017/0167291 A1* | 6/2017 | Koroly | ..................... | B64C 1/40 |
| 2019/0063318 A1 | 2/2019 | Roach et al. | | |
| 2019/0185171 A1 | 6/2019 | Gakhar et al. | | |
| 2020/0200084 A1 | 6/2020 | Desjoyeaux et al. | | |
| 2021/0049993 A1 | 2/2021 | Cazeaux et al. | | |

FOREIGN PATENT DOCUMENTS

| | | |
|---|---|---|
| CN | 208164418 | 11/2018 |
| CN | 209492258 | 10/2019 |
| EP | 2605238 | 6/2013 |
| JP | 2016018211 | 2/2016 |
| WO | 2020/053514 | 3/2020 |

OTHER PUBLICATIONS

International Preliminary Report on Patentability from corresponding PCT Appln. No. PCT/EP2022/057622, dated Oct. 10, 2023.
Office Action from related Japanese Appln. No. 2023-560976, dated Sep. 29, 2025. English translation attached.
Office Action from related Chinese Appln. No. 202280027109.7, dated Aug. 9, 2025. English translation attached.

* cited by examiner

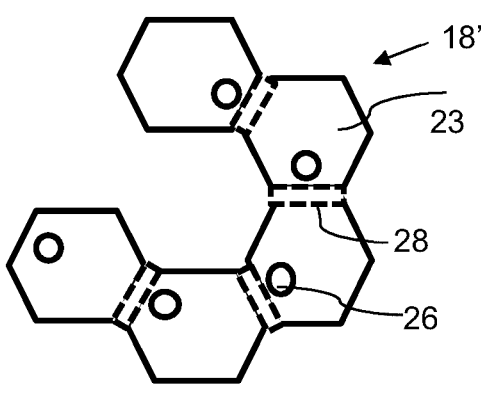
FIG.2F
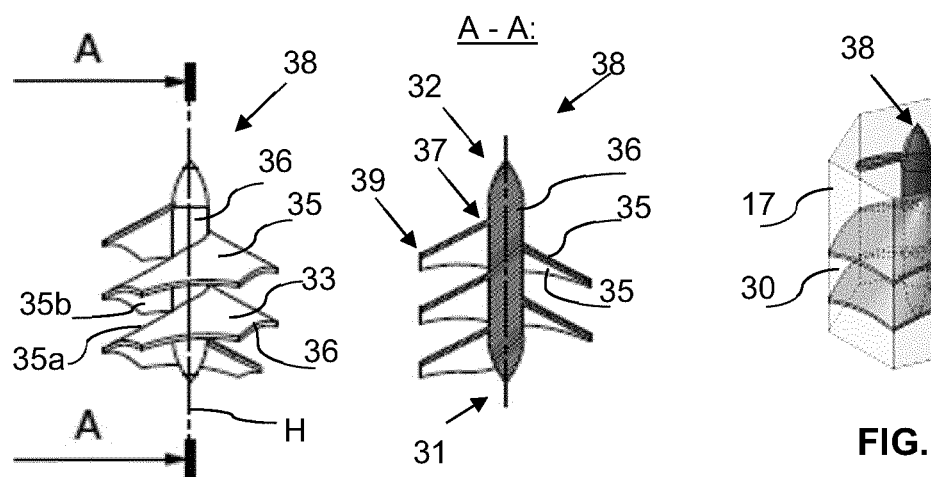
FIG.3A
FIG.3B
FIG.3D
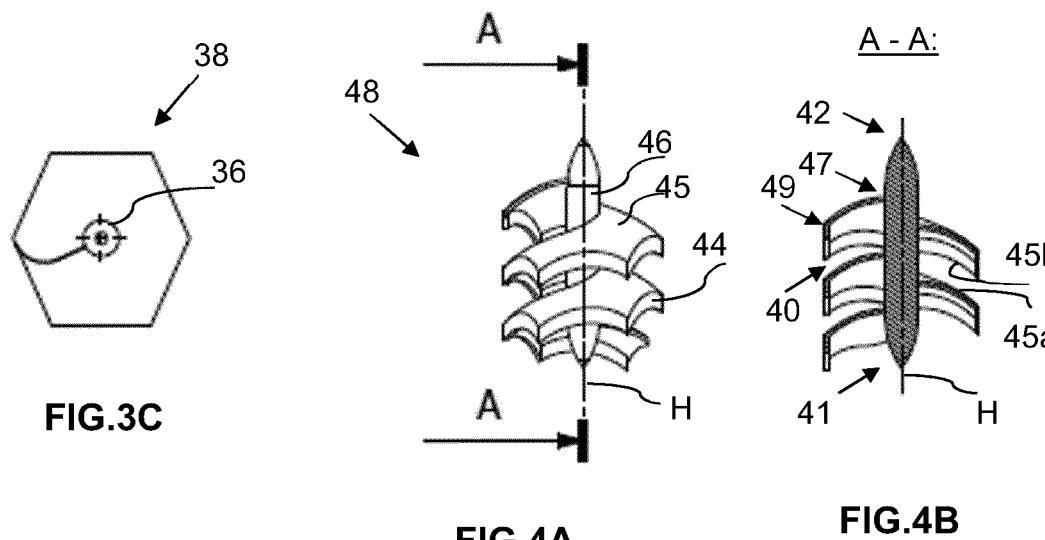
FIG.3C
FIG.4A
FIG.4B

SOUND-ATTENUATING COMPOSITE COMPONENT WITH HONEYCOMB CORE AND PRODUCTION METHOD THEREFOR

FIELD

The invention relates to a composite component for attenuating sound waves, in particular for attenuating the operating noise of an aircraft, such as for example a passenger aircraft with jet engines.

BACKGROUND

It is known to reduce noise emission from aircraft engines by providing a sound-attenuating lining on the inside of the engine nacelle or at other suitable locations. The invention is not limited to this field of application, but is particularly suited to the attenuation of operating noise from aircraft engines.

Such a sound-attenuating lining may take the form of panels, for example. These conventionally comprise a sandwich arrangement with a honeycomb core between two facesheets, wherein in general one of the facesheets, which faces the source of the sound, is acoustically transmissive, for example is perforated. The honeycomb cells of the honeycomb core here act as acoustic resonators in the manner of a Helmholtz resonator, attenuating or reducing the sound.

To improve sound attenuation, it is known to arrange acoustically transmissive acoustic septa within the honeycomb cells.

Aircraft jet engines typically cause noise in the frequency range of around 300-6300 Hz. The lower the frequency, the greater the depth of the honeycomb cells would have to be to achieve desired sound attenuation. However, this is not always possible or desirable due on the one hand to the associated increase in weight and on the other hand to the desired small component dimensions, e.g. due to limited installation space.

To achieve sound attenuation in the lower frequency range without increasing the depth of the honeycomb cells or the thickness of the honeycomb, it is already known to introduce acoustic inserts into the honeycomb cells.

US 2015/0041247 A1 describes a sound-absorbing composite component comprising a honeycomb plate between two facesheets, wherein one of the facesheets reflects sound and the other is acoustically transmissive, namely perforated. Each honeycomb cell in each case accommodates a conical insert, the wider edge of which is joined to the edge of the honeycomb and the acoustically transmissive facesheet and the narrower edge or open tip of which opens into the interior of the honeycomb. The insert reflects sound and divides the honeycomb cell into two acoustic chambers, resulting in an increase in resonator length or effective acoustic length of the honeycomb cell.

By varying the position of the insert over the depth of the honeycomb it is possible, according to US 2015/0041247 A1, to change the frequency range of the absorbed sound. The possibility of adaptation to still lower frequencies is very limited here, however.

SUMMARY

It is therefore an object of the present invention to propose a compact, lightweight acoustic system for sound attenuation, in particular for aircraft operating noise, which can be adapted as simply as possible to different frequency ranges.

A composite component of the type in question comprises at least one honeycomb or one honeycomb core with a plurality of honeycomb cells and with a number of acoustic insert bodies, in each case at least one insert body being arranged in at least some honeycomb cells. The insert body has a main axis, which defines an axial direction. The insert body has been or is arranged in a respective honeycomb cell or inserted in a respective honeycomb cell in such a way that the main axis of the insert body runs in the depth direction of said honeycomb cell. The insert body comprises a cohesive surface and, relative to the direction of the main axis, a first end and a second end. The insert body extends continuously, in particular as a cohesive or one-piece component, between the first end and the second end.

The above-stated object is achieved, in the case of a composite component of the type in question, merely in that the cohesive surface of the insert body has surface regions, spaced from one another in the axial direction or in the direction of the main axis, which face one another and overlap, in particular are aligned with one another, in a projection onto a plane lying perpendicular to the main axis in order to demarcate a passage for sound waves between these surface regions in the axial direction or direction of the main axis.

In this case, according to the invention the cohesive surface is in particular arranged or configured in such a way that the course of the cohesive surface encircles the main axis and/or repeatedly crosses the main axis. The course in question here runs from the first end of the insert body, through the surface regions according to the invention and to the second end of the insert body.

Alternatively or in addition, the above-stated object is also achieved, in the case of a composite component of the type in question, in that the cohesive surface of the insert body has surface regions, spaced from one another in the direction of the main axis, which face one another and overlap, in particular are aligned with one another, in a projection onto a plane lying perpendicular to the main axis in order to demarcate a passage for sound waves between these surface regions in the direction of the main axis, the insert body subdividing the honeycomb cell into a plurality of cavities which are demarcated in the direction of the main axis by the mutually facing surface regions. The insert body may subdivide the honeycomb cell into three or more cavities.

The invention also relates to the acoustic insert body per se or in itself, for installation in a honeycomb for attenuating sound waves, in particular for attenuation of the operating noise of an aircraft.

An insert body of the type in question has a main axis which defines an axial direction, and may be inserted with its main axis in the depth direction of a honeycomb cell, in particular into a hexagonal honeycomb cell. The insert body here comprises a cohesive surface and, relative to the axial direction, a first end and a second end.

According to the invention, provision is made for the cohesive surface of the insert body to have surface regions, spaced from one another in the axial direction, which face one another and overlap, in particular are aligned with one another, in a projection onto a plane lying perpendicular to the main axis in order to demarcate a passage for sound waves between these surface regions in the axial direction or direction of the main axis, and for the cohesive surface to be configured such that the course of the cohesive surface encircles the main axis and/or repeatedly crosses it.

The course in question here also runs from the first end of the insert body, through the surface regions according to the invention and to the second end of the insert body. The cohesive surface may here also run through further surface regions of the insert body, not only through the surface regions which delimit the passage of the sound waves in the axial direction.

Alternatively or in addition, provision is made, in the case of an insert body of the type in question, for the cohesive surface of the insert body to have surface regions, spaced from one another in the direction of the main axis, which face one another and overlap, in particular are aligned, in a projection onto a plane lying perpendicular to the main axis in order to demarcate a passage for sound waves between these surface regions in the direction of the main axis and to subdivide the honeycomb cell into a plurality of cavities, preferably into three or more cavities, which are demarcated in the direction of the main axis by the mutually facing surface regions.

The respective honeycomb cell is defined by its cell walls in directions (L/W directions) transversely of the direction of the honeycomb depth. A honeycomb or honeycomb plate typically comprises a plurality of honeycomb cells adjoining the closest honeycomb cells by way of their walls. The composite component may comprise at least one flat sheet, for example a facesheet, and at least one honeycomb. The walls of the honeycomb cells may be arranged transversely of the flat sheet, in particular perpendicular to the flat sheet. In the composite component, the edges of the honeycomb walls may be in contact, in particular be firmly connected, with the flat sheet.

The insert body may be inserted or insertable into a honeycomb cell in such a way that its main axis is oriented in the direction of the honeycomb depth. In the case of level, unbent or uncurved composite components, the main axis may run parallel to the walls of the honeycomb cell and/or perpendicular to the flat sheet, for example facesheet.

The insert body may in particular interact with the walls of the honeycomb cell in which it is accommodated in order to direct sound waves within the honeycomb cell. The surface or face of the insert body may interact with the walls of the respective honeycomb cell as a directing or guide surface for sound waves.

The insert body is in particular configured, when inserted into a honeycomb cell, to prevent the sound waves penetrating into this honeycomb from passing in a straight line in the depth direction of the honeycomb cell.

The insert body according to the invention may thus be used to deflect the sound waves onto a longer path, for example onto a winding, curved, zigzag path. The insert body may thus, in a structurally relatively simple manner, bring about a considerable increase in the resonator length or effective acoustic length of the honeycomb cell. The insert body allows optimized utilization of the given cavity of a honeycomb cell with regard to the acoustic effect, in particular attenuating effect. In particular, the honeycomb thickness of 30 to 50 mm typically used in aircraft engines for sound attenuation in the frequency range of around 2000 Hz may be reduced by a third or even a half, for example to a honeycomb thickness of 15 mm, by using the insert body.

The insert body may contribute to sound attenuation by deflecting the sound waves, in particular by reflection at surface regions of the insert body. Furthermore, the insert body may also in part absorb sound energy.

The terms radial direction and axial direction relate here, where not otherwise stated, in general to the main axis of the insert body. The main axis should here be understood to mean the central axis which, when the insert body is properly oriented in the honeycomb cell of a level honeycomb, lies substantially or virtually parallel to the walls of the honeycomb cell. The main axis does not in the present case necessarily mean the direction of greatest extent of the insert body. The insert body may for example have a greater extent in the radial direction than in the axial direction. The main axis may however also correspond to the longitudinal axis. The main axis need not necessarily be an axis of symmetry of the insert body, but the main axis does however preferably lie approximately centrally in longitudinal section.

When the insert body is arranged properly in the honeycomb cell, such that the main axis of the insert body runs in the direction of the honeycomb depth, radially outer edges of the insert body may and should adjoin the walls of the honeycomb cell with a minimal gap dimension or be in contact therewith and in particular be joined, for example adhesively bonded, thereto. A slight gap or space may optionally also be present between at least some portions of the radially outer edges of the insert body and honeycomb wall. The gap or space may be acoustically transmissive.

The main axis may in particular correspond to the main axis of inertia of the insert body. An outline of the insert body may in particular be rotationally symmetrical relative to the main axis.

An overwhelming majority of the honeycomb cells preferably in each case comprise at least one insert body. Honeycomb cells may in each case accommodate more than one insert body. Honeycomb cells may also accommodate different insert bodies at the same time, so increasing flexibility with regard to adapting the composite component to the frequency range it is wished to attenuate. The position of the respective insert body relative to the depth of the honeycomb cell may likewise be adapted to the frequency range to be attenuated. The insert body may in particular occupy only part of the honeycomb depth.

A finished honeycomb may be subsequently equipped with insert bodies. An insert body may however also be inserted or installed into the honeycomb structure during honeycomb production or produced in one step together with the honeycomb. Irrespective of the production method therefor, the insert body should be understood to be a body which may also exist as a body outside the honeycomb cell due to its cohesive geometry.

The insert body in particular has a standalone cohesive surface or face. This cohesive surface has an uninterrupted course or runs in uninterrupted manner from the first end to the second end of the insert body. The course may be understood to be an uninterrupted three-dimensional curve, which lies within the cohesive surface of the insert body or defines the course thereof. The honeycomb walls in this case in particular do not contribute to the cohesive surface.

The cohesive surface may be formed by different portions of the insert body, which may be differently shaped. In the case of strip-like body portions, the two sides of the strip may contribute to the cohesive surface. Passage openings may be provided, such that the sound waves may pass through these passage openings from one side to the other of the strip.

The cohesive surface of the insert body is configured such that it is possible to plot an uninterrupted three-dimensional curve or course curve on or within this face which encircles the main axis of the insert body and/or repeatedly crosses it. This course curve here also runs, inter alia, through those regions of the cohesive surface which face one another and demarcate a passage or way through for sound waves in the axial direction. Between these surface regions, however, further surface regions may be arranged, relative to the axial direction. The passage may preferably also encircle the main axis and/or repeatedly cross it.

The spacing between in each case two surface regions delimiting the passage of sound from one another may be of different sizes, relative to the axial direction or direction of the main axis. This spacing may be individually adapted, in order to adapt the insert body purposefully to the frequency range to be attenuated.

Hexagonal honeycomb cells are preferred. The honeycomb may however comprise honeycomb cells of various cell geometries. In cross-section perpendicular to the direction of the honeycomb depth, the honeycomb cells may have an irregular or regular shape, in particular be circular or have a polygonal shape, which may for example be rectilinear, in particular square.

The cell walls of the honeycomb cells may be acoustically non-transmissive or acoustically transmissive, for example perforated, in order to allow the sound waves to propagate in the L and W directions of the honeycomb.

In one preferred embodiment, the cohesive surface substantially covers the cross-section of the honeycomb cell into which the insert body may be or has been inserted. In this case, the cohesive surface is observed in its projection onto the plane lying perpendicular to the main axis or onto the outline of the honeycomb. The corresponding coverage may in particular be achieved by at least one turn, preferably multiple turns, of the cohesive surface. Thus, in plan view, the insert body preferably has an outline which matches with the outline of the honeycomb cell or very largely fills it (apart from small gap dimensions relative to the cell walls).

In one embodiment, the insert body has a central elongate trunk or stem which extends continuously in the direction of the main axis, in particular from the first end of the insert body to the second end of the insert body. The trunk contributes to reinforcement of the insert body, something which is advantageous when it comes to increasing dimensional stability. The main axis of the insert body may extend within the trunk.

In one preferred embodiment, the cohesive surface comprises a generalized helicoid. A generalized helicoid is understood to mean a face which arises when a screw motion is applied to a three-dimensional curve. The generalized helicoid may be both right-handed and left-handed. The insert body may have a two-start or multi-start generalized helicoid. The helicoidal lines may be intertwined.

In addition or alternatively, the cohesive surface may comprise or form a developable surface. A developable surface may, according to geometric definition, be laid smoothly onto a flat plane without compression or stretching. A developable geometry inter alia allows specific production methods, such as for example production using folding techniques.

The cohesive surface of the insert body may, in the geometric sense, in particular be a ruled surface, preferably a developable ruled surface.

The cohesive surface may comprise a tangent developable and/or a helicoid or helical surface.

The generalized helicoid does not necessarily constitute a ruled surface. In one embodiment, the generalized helicoid is multiaxially curved. The generalized helicoid may in particular be concavo-convex in shape. The generalized helicoid may be configured at least in places to be stepped or take the form of a spiral staircase. The generalized helicoid may in particular be corrugated at least in places.

The generalized helicoid may have a regular or irregular pitch. Different turns of the generalized helicoid may be differently spaced from one another in the axial direction.

This enables a particular degree of flexibility and design freedom when adapting the geometry of the insert body to the sound wave frequency range to be attenuated. Without being bound by theory, it is assumed that different axial spacing between the turns of the generalized helicoid may influence not only the intensity but also the frequency of the sound waves.

The generalized helicoid may have a helicoid axis which runs in the direction of the main axis of the insert body or parallel to the main axis and preferably coincides with the main axis.

The generalized helicoid may have a radially inner edge and a radially outer edge, relative to the main axis.

The insert body may comprise a helical or spiral part of the body which winds around the main axis, provides the generalized helicoid and has a radially outer edge along the radially outer edge of the generalized helicoid. This radially outer edge of an insert body accommodated in a honeycomb cell may be joined, in particular bonded, for example adhesively bonded to the walls of the honeycomb cell. In one embodiment, the radially outer edge of the insert body may, however, be spaced from at least one of the honeycomb walls and allow a passage for sound waves.

The axis of the generalized helicoid may in particular extend within the trunk, such that the generalized helicoid winds around the trunk.

In one embodiment, the radially inner edge may be completely or partly joined to the trunk or extend on the trunk or be borne by the trunk. In this embodiment, the generalized helicoid may optionally merge in one piece into the surface of the trunk.

In one further embodiment, the radially inner edge may be completely or partly self-supporting. This embodiment is advantageous if the honeycomb equipped with the insert bodies is to be subsequently shaped, for example to adapt the honeycomb to a curved inner surface of an aircraft engine. A honeycomb with insert bodies, which in each case have a free radially inner edge, has greater flexibility than a honeycomb with insert bodies which have a central trunk. In particular, in this embodiment the radially inner edge may be completely self-supporting in the case of the insert body, i.e. no central or middle trunk is provided for reinforcement, in order to increase subsequent shapeability.

In one embodiment with a completely self-supporting inner edge of the generalized helicoid, the insert body may have a free space running continuously about the main axis, about which free space the generalized helicoid turns. The free space may have various geometries, perpendicular in plan view, to the main axis and be of different sizes at different points along the main axis. This embodiment is advantageous for increased shapeability and flexibility of the honeycomb, and also for ventilation, venting, dewatering or drainage of the honeycomb.

The course of the cohesive surface may—in particular when a generalized helicoid is used—encircle the main axis in particular at least over 360°, preferably over distinctly more than 360°, i.e. the angle of rotation about the main axis of the entire generalized helicoid may amount to distinctly more than one rotation, preferably at least 720°, i.e. two rotations. In this way, the effective acoustic length or path of the sound waves through the honeycomb cell may be markedly lengthened. In this way, distinctly lower sound frequencies can be attenuated by the composite component.

In one embodiment, the insert body may be configured by subdividing the honeycomb cell into cavities. The cavities may be demarcated at least in the axial direction or direction of the main axis by the cohesive surface. The respective cavity may be delimited by an insert body and at least one wall of the honeycomb cell.

In one embodiment, the insert body subdivides the honeycomb cell into a number of like or identical cavities. In another embodiment, different cavities are formed.

At least some cavities are preferably connected together in acoustically transmissive manner, for example in each case by at least one passage opening between in each case two cavities.

The passage openings may be positioned such that the path of the sound wave through the honeycomb cell adopts a meandering, serpentine or zigzag course. In this way, the path of the sound within the honeycomb cell is lengthened.

The surface regions considered may in principle have a curved or substantially planar geometry.

At least some surface regions of the cohesive surface of the insert body may run obliquely to the main axis.

At least some of the mutually facing surface regions between which the sound wave propagates may run obliquely to one another.

In one embodiment, the insert body has at least two funnel-shaped or pyramidal body portions which may be arranged offset relative to one another in the direction of the main axis, in particular coaxially with the main axis, and may provide the mutually facing surface regions. These body portions may have the shape of a hollow bottomless pyramid with a closed tip, with a polygonal base area, for example hexagonal or quadrangular, which corresponds in shape to the cross-section of the honeycomb cell, into which the insert body is to be inserted. The side faces of the pyramids may adjoin one another by way of edges or be rounded. The funnel-shaped or pyramidal body portions may be arranged nested inside one another, such that a passage for sound waves remains free between the body portions. At least some of the funnel-shaped or pyramidal body portions may be in contact at their periphery with the walls of the honeycomb cell and so subdivide the honeycomb cell into cavities which are demarcated from one another in the axial direction.

The successive pyramidal body portions may have passage openings, in particular alternately either in the middle region or at the periphery thereof. The passage openings may enable the sound waves to spread into a cavity, along the mutually facing surface regions which are formed by the closest funnel-shaped or pyramidal body portions, and to a next cavity, preferably only on a zigzag path.

The pyramidal or funnel-shaped body portions may be joined together by at least one connecting portion. The at least one connecting portion may be a trunk arranged in the middle or centrally and extending in the direction of the main axis. The main axis may run through the trunk. The trunk may be of hollow configuration to save weight. The trunk may have different cross-sectional shapes.

Alternatively or in addition, the insert body may have multiple joining portions arranged off-center or non-centrally, in particular peripheral joining portions. A central trunk is advantageous since it may be used for gripping purposes on insertion of the insert body into the honeycomb cell.

At least some of the surface regions may in particular be curved, for example concavely or convexly configured.

At least some of the surface regions may be bent or have bending edges and/or steps.

The surface regions may preferably act as rebound surfaces and direct the sound waves to deflect the sound from a straight path to the honeycomb bottom.

In one embodiment, the cohesive surface of the insert body comprises a ruled surface. A ruled surface is here understood to mean, according to the geometric definition, a surface through every point of which a straight line may run which is wholly contained in the surface.

Alternatively or in addition, the cohesive surface of the insert body may have convex and/or concave surface regions.

Furthermore, the cohesive surface of the insert body may comprise a stepped and/or corrugated surface, at least in places.

The insert body may preferably be produced in one part or one piece or as an integral body.

The insert body may be of uniform material or made of regions with in each case different material compositions.

The insert body may in particular be made of plastics, such as for example of thermoplastics, preferably of high-temperature thermoplastics, and also of thermosets. Furthermore, the insert body may be made from fibrous materials, for example from woven fabric, laid fabric, paper or non-woven fabric, in particular from glass and/or carbon fibers.

The insert body is preferably made from a composite material, for example a composite of glass or carbon fibers with a thermoplastic or thermoset.

The insert body may in particular be produced using an additive manufacturing process, for example by 3D printing. Feasible additive manufacturing, or AM, processes in particular include processes designated additive manufacturing processes as per VDI standard 3405 or DIN EN ISO 17296-2 (Part II). AM processes allow inherently automated, computer-aided manufacture of virtually any desired complex geometry, typically based on a structure applied layer-by-layer. Further examples of particularly suitable AM processes are direct printing with automatic curing of the printing composition or indeed 3D printing by techniques such as polymerization, adhesive bonding, sintering/melting etc.

The advantage of additives manufacturing is that the shape of the insert body can be freely selected or adapted in accordance with acoustic requirements.

In one embodiment, the insert body may for example be printed directly into the honeycomb cells. The honeycomb may also optionally be produced by 3D printing, for example in one step with the insert body.

The insert body may be produced completely or integrally in one additive manufacturing process. Extrusion-based (EB) methods are in addition particularly suitable, either with chemical curing or with physical solidification of heated thermoplastics. The fused deposition modeling (FDM) method is for example also suitable. Material jetting (MJ) methods are also conceivable, for example with photopolymers which solidify through exposure to light. What are known as binder jetting (BJ) methods, sometimes also denoted 3DP methods, are likewise feasible. All "3D printing" techniques are in principle suitable.

The following materials are particularly suitable for additive manufacturing processes: metals such as for example aluminum and titanium; thermosets, including epoxy, phenols, benzoxazines, cyanate esters, polyimides; high temperature-resistant thermoplastics such as for example PEEK or PEI; elastomers such as for example thermoplastic polyurethane, polysiloxanes; and ceramic materials such as for example oxide-ceramic or carbide-ceramic materials. These materials may contain fibers, in particular glass, carbon, aramid and/or ceramic fibers, in order, where necessary, to improve mechanical or vibration-relevant, oscillation characteristics.

The insert body may, however, be produced using any desired technology, for example even using a suitable folding technique and/or stamping method. The insert body may for example be folded and/or produced by stamping from a metal foil such as for example aluminum foil or a plastics film. Further materials for producing the insert body by folding may be aromatic polyamide papers (aramids) such as for example Nomex® and Kevlar® papers, preferably in a thickness from 1.1 to 3.9 mil, where 1 mil corresponds to 0.0254 mm.

The insert body may moreover be made from thermoplastic films by folding and/or stamping. The latter may additionally also be carried out by thermoforming the thermoplastic material through the action of heat. The films may have a thickness of from a few micrometers to about 1 mm and for example be made from polyetherimide (PEI), polyimide (PI), polyetherether ketone (PEEK), polyphenylene sulfide (PPS), polycarbonate, polyamide, and/or polyester.

The cohesive surface may for example be formed in part or completely by a strip of plastics material, in particular a thermoplastic, and/or from fibers, in particular from glass, carbon, plastics, aramid, or ceramic fibers, and/or from metal.

In one embodiment, the insert body may, at least in places, comprise an air-permeable material. An example of a feasible air-permeable material is an open-pore material and/or a micro-perforated material (with pores of from 0.01 to 0.5 mm in diameter) or macro-perforated material (with pores of >0.5 mm in diameter). Air-permeable material may be used in particular to bring about a type of acoustically transmissive septum.

In one embodiment, the composite component comprises at least one facesheet and/or intermediate sheet, which is joined to the honeycomb. The composite component may comprise a layer arrangement of sandwich construction, wherein the honeycomb or the honeycomb core is arranged between two facesheets, in particular is covered or closed on both sides by the facesheets. One of the facesheets may be perforated and/or consist of an air-permeable material.

The composite component may comprise a plurality of honeycombs, for example two honeycomb sheets either side of a flat intermediate sheet, wherein in each case one honeycomb sheet is in each case joined, for example adhesively bonded, to one side of the intermediate sheet.

The composite component may in particular comprise a layer arrangement comprising a plurality of honeycomb layers and a plurality of flat intermediate layers, which may be acoustically transmissive, in particular perforated, or closed. The composite component may in particular take the form of a "multisandwich". One or more or all of the honeycomb layers may be equipped with the acoustic insert body.

The facesheet and/or intermediate sheet may for example be made from plastics, composite material, metal, and/or ceramics.

The facesheet or intermediate sheet and/or the honeycomb may be made of plastics and in particular comprise a woven fabric, laid fabric, paper or nonwoven fabric of fibers, or be made solely of plastics or indeed solely of fibers, for example in the form of woven fabric, laid fabric, paper or nonwoven fabric. The facesheet and/or intermediate sheet and/or the honeycomb sheet may be made from a composite material, in particular from a composite material comprising fibers, for example in the form of woven fabric, laid fabric, paper or nonwoven fabric. The facesheet or intermediate sheet may comprise a metal foil, for example of aluminum, titanium or Inconel® from Special Metals Corp.

Feasible plastics used are in particular thermoplastics such as for example PE (polyethylene), PP (polypropylene), PA (polyamide), PET (polyester), PC (polycarbonate), preferably high-temperature thermoplastics, such as for example PI, PPS, PEI, PEEK, PEKK. Thermosets such as phenol, epoxy, benzoxazine, bismaleimide, cyanate ester or polyimide resins or thermoplastic-thermoset resins such as phenoxy resins, may also be used to produce the facesheets or the honeycomb.

The honeycomb and/or the facesheet or intermediate sheet may comprise a ceramic material, in particular be made of a ceramic composite material. Ceramic structures are advantageous for high-temperature applications.

The insert body itself may be adhesively bonded to adjoining walls of the respective honeycomb cell and/or to the facesheet or intermediate sheet. It is, however, also possible for the insert body to be held in the respective honeycomb cell by frictional engagement or force-locking engagement with the honeycomb walls, optionally also without adhesive.

The invention further relates to a method for producing a composite component for attenuating sound waves. The method comprises at least providing a mostly prefabricated honeycomb and inserting acoustic insert bodies into honeycomb cells of the honeycomb.

The method is characterized by producing the insert body using an AM or additive manufacturing process, resulting in an insert body with in each case one cohesive surface, in particular a surface according to one of the above-explained geometries. The insert body may in particular be constructed in situ within the honeycomb cells using an AM process.

In one embodiment of the method, the honeycomb is also produced by an AM process. Providing the honeycomb and inserting or forming acoustic insert bodies in honeycomb cells of the honeycomb may preferably be carried out in one step using the additive manufacturing process.

The additive manufacturing process may in particular be a 3D printing method, or indeed another AM process, as explained further above.

Additive manufacture permits the widest range of geometries, in which the cohesive surface of the insert body has surface regions, spaced from one another in the axial direction, which face one another and overlap, in particular are aligned with one another, in a projection onto a plane lying perpendicular to the main axis in order to demarcate a passage for sound waves between these surface regions in the axial direction, the cohesive surface being configured such that the course of the cohesive surface encircles and/or repeatedly crosses the main axis.

The method may comprise the creation of perforations in a facesheet and/or in the insert body. The perforations or passage openings may for example be provided over the course of additive manufacture by relieving corresponding points. The perforations or passage openings may however also be created subsequently, for example by mechanical piercing or by laser machining etc.

A certain sound permeability may be achieved in one embodiment by using an open-pore material.

The production method may in particular comprise adhesive bonding, optionally with the action of heat, of the insert body to adjoining walls of the respective honeycomb cell and/or to one or both facesheets or optionally intermediate sheet(s). The insert body may furthermore be joined in bonded manner by a thermal method to adjoining walls of the respective honeycomb cell and/or to one or both facesheets or optionally intermediate sheet(s), for example by welding in the case of metallic honeycombs or facesheets and insert bodies or by fusing on in the case of thermoplastic honeycombs or facesheets and insert bodies.

The insert body may preferably be joined in bonded manner, or at least in contact, at all the edges thereof with the walls of the honeycomb cell, so as to prevent linear propagation of the sound waves along the walls of the honeycomb cell.

The insert body may be produced using a widened, for example flanged, edge, which may be advantageous for adhesive bonding-in purposes.

The insert body may in particular also be manufactured by 3D printing with and within a "cell" which corresponds in shape to a honeycomb cell and is insertable into a honeycomb cell of a honeycomb sheet. The walls of this "cell" may have cutouts to reduce weight.

Producing the composite component by inserting insert bodies into a prefabricated honeycomb has the advantage that an existing, mass-produced honeycomb can be used. A tried and tested and optionally certified production method for the honeycomb then does not have to be modified. Production of the insert body does not have to be dependent on the honeycomb production method.

The widest range of insert body geometries can be achieved, in particular by additive manufacture. The insert body may be configured to match the frequency range to be attenuated. If required, differently configured insert bodies may optionally be introduced into the same honeycomb.

BRIEF DESCRIPTION OF THE DRAWINGS

Further features and advantages of the invention may be inferred without limitation of the scope of protection from the following description of a number of preferred exemplary embodiments made on the basis of the appended figures, in which:

FIG. 2F: shows a modification of the insert body according to FIGS. 2A-2E in plan view onto an intermediate form in an unfolded state;

FIGS. 3A-3D: show a further exemplary embodiment of an acoustic insert body for a composite component according to FIG. 1A, with a generalized helicoid and a central trunk, in front view (FIG. 3A), in longitudinal section (FIG. 3B), in plan view (FIG. 3C), and in perspective view within a honeycomb cell (FIG. 3D);

FIGS. 4A-4B: show a further exemplary embodiment of an acoustic insert body for a composite component according to FIG. 1A, with a concavo-convex generalized helicoid and a central trunk, in front view (FIG. 4A) and in longitudinal section (FIG. 4B);

DETAILED DESCRIPTION

Figures 1A, 1B, 1C, 2A, 2B, 2C, 2D, 2E:
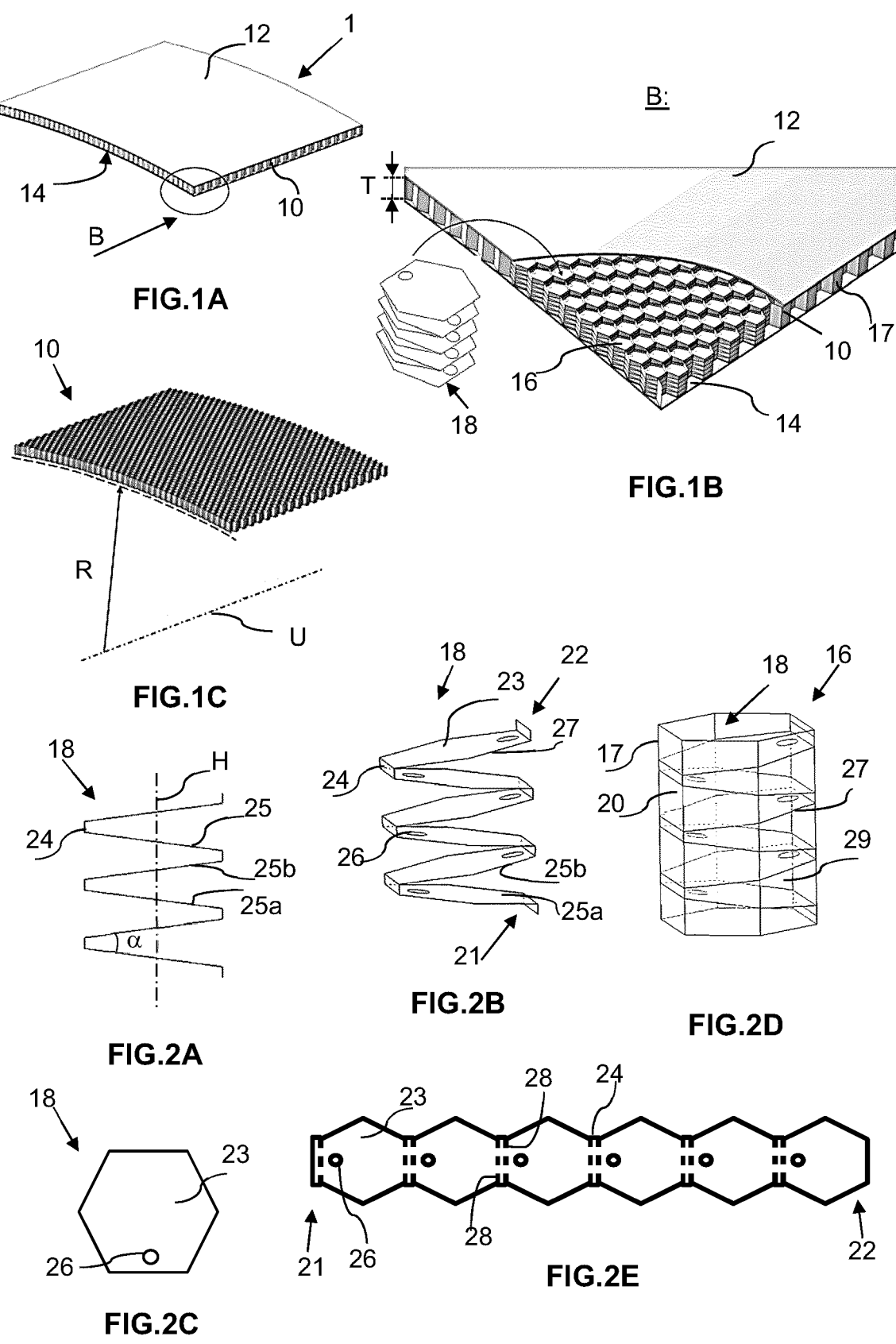
FIGS. 1A-1C: show an exemplary embodiment of a composite component in perspective view (FIG. 1A), of a region B in partial view (FIG. 1B) and of a honeycomb for the composite component in perspective view (FIG. 1C)
FIGS. 2A-2E: show a first exemplary embodiment of an acoustic insert body for the composite component according to FIG. 1A, in side view (FIG. 2A), in perspective view (FIG. 2B), in plan view (FIG. 2C), in perspective view within a honeycomb cell (FIG. 2D) and in plan view onto an intermediate form of the insert body in an unfolded state (FIG. 2E)

FIGS. 1A-1B show an exemplary embodiment of a composite component 1 of sandwich construction with a honeycomb sheet 10 arranged between two facesheets 12, 14. The composite component 1 is suitable, for example, as a sound-attenuating engine lining. The composite component 1 is curved or bent with a radius of curvature R about a theoretical bending axis U and may thus be mounted in matching manner to concave inner surfaces, for example of an aircraft engine nacelle. The inner facesheet 14 facing the bending axis U and shown at the bottom in FIG. 1B is perforated and thus acoustically transmissive. The composite component 1 is arranged in such a way in the proper operational position that the inner facesheet 14 faces the sound source, for example in the interior of the engine nacelle. The sound waves may penetrate through the perforations (not shown) into the honeycomb cells 16 of the honeycomb 10 arranged below the facesheet 14. The outer facesheet 12, remote from the bending axis U and shown at the top in FIGS. 1A and 1B, is closed and has a sound-reflecting action. In this proper operating position, this facesheet is further away from the sound source than the perforated inner facesheet 14. Sound waves may propagate from the sound source through the perforated facesheet 14 and through the honeycomb 10 to the outer facesheet 12 and back in the opposite direction.

In the example according to FIGS. 1B and 1C, the honeycomb sheet 10 comprises honeycomb cells 16 in each case with a hexagonal cross-section. Each honeycomb cell 16 thus has six walls 17, which run substantially perpendicular to the facesheets 12, 14 and demarcate the interior of the respective honeycomb cell 16 from the adjacent honeycomb cells. The height of the walls 17 of the honeycomb cells 16 or the depth T of the honeycomb cell 16 corresponds to the distance between the facesheets 12, 14.

In one exemplary embodiment, the two facesheets 12, 14 have a thickness of 1 mm. The outer facesheet 12 is a laminate made up of three layers of woven carbon fiber fabric in an epoxy resin matrix. In one exemplary embodiment, the inner facesheet 14 likewise comprises three layers of woven carbon fiber fabric in an epoxy resin matrix. In a further exemplary embodiment, the inner facesheet 14 is made from aluminum, in this case from 2024 T3, T6, T351 or T81 "clad" or "bare" aluminum. 5052 or 5056 aluminum are also suitable for the facesheet 14. Furthermore, the two facesheets 12, 14 may be made from 3 layers of carbon fiber woven prepreg with high temperature-resistant polyimide resin. The facesheet 14 is preferably perforated. The perforation holes are for example 0.5 to 1 mm in diameter, form a regular grid and are spaced from one another for example by 2.25 or 2.5 mm, depending on direction.

The honeycomb 10 is made from a composite material comprising aramid fibers and phenolic resin, a shapeable aviation-grade ECA 9.6-48 honeycomb made by the applicant (9.6 mm cell size, 48 kg/m³ bulk density) being used, with a honeycomb thickness or honeycomb cell wall height or honeycomb cell depth T of 11 mm. The honeycomb 10 is joined to both facesheets 12, 14 by an epoxy adhesive film. Curing of the resin fraction is achieved within 120 min in an autoclave, at at least 6 bar and 176° C.

In a further exemplary embodiment, the facesheets 12, 14 are made from a prepreg comprising bismaleimide resin (BMI) and adhesively bonded using BMI adhesive film.

In principle, different types of honeycomb 10 can be used for the purposes of the invention, preferably with a size for the honeycomb cells 16 of 3.2 to 50 mm, in particular up to 25.4 mm, and a bulk density for the honeycomb 10 of from 16 to 256 kg/m³.

The honeycomb thickness or honeycomb dimension in the depth direction (depth: in the T direction, perpendicular to the L/W plane of the honeycomb) may be between 5 and 50 mm. For an engine lining, the depth of the honeycomb 10 preferably amounts to between 8 and 35 mm. In one exemplary embodiment, the honeycomb 10 is made from metal foil. In exemplary embodiments where operating temperatures are extremely high, such as for example 600 to 1200° C. or 1200° C. to 2000° C., the honeycomb 10 is made from an oxide-ceramic or carbide-ceramic material.

The honeycomb 10 may in particular be made using the expansion method. In one exemplary embodiment of the production method, firstly a multi-sheet arrangement comprising the honeycomb 10 and the external facesheet 12 is prepared.

An insert body 18 is then inserted into each honeycomb cell 16, such that its main axis H runs parallel to the direction of honeycomb depth T. The insert body 18 may then optionally be joined, in particular adhesively bonded, to the cell walls of the honeycomb. The multi-sheet arrangement is completed by adhesive bonding to the facesheet 14.

The honeycomb 10 may optionally be shaped, for example bent, into a desired shape, or produced directly with a curvature. The insert bodies may be introduced into a flat honeycomb, which is then optionally bent. The insert bodies may, however, be inserted into a honeycomb which already has a desired curvature.

According to a further exemplary embodiment of the production method, the insert body is printed directly by 3D printing into the honeycomb cells of a prefabricated multi-sheet arrangement consisting of the outer facesheet 12 and the honeycomb 10.

According to a further exemplary embodiment of the production method, the honeycomb is produced together with the insert bodies in one step by 3D printing. According to a further exemplary embodiment of the production method, the honeycomb is provided by precutting individual films (production of half-cells), adhesively bonding the insert bodies to one precut film and laying the next precut film thereon (in order to complete the honeycomb cells) and so on.

In all the exemplary embodiments shown here, the insert body may be introduced into the honeycomb cell in such a way that one end thereof faces the sound source.

The insert body may occupy the entire depth of the honeycomb cell or just a part thereof, and for example be arranged centrally with regard to the honeycomb depth or closer to one or the other edge of the honeycomb cell.

FIGS. 2A-2C show the insert body 18 according to a first exemplary embodiment, comprising six flat, plate-like hexagonal body portions 23, which are arranged at an acute angle α relative to one another and are in each case joined together by a narrow, quadrangular body portion 24. The body portions 24 may, however, also have a shape other than that illustrated, or different body portions 24 may have different shapes. The angle α need not necessarily be identical between the different body portions 23. The insert body 18 has a first and a second end 21, 22, between which it extends continuously. Together with the body portions 24, the body portions 23 form a cohesive surface 25, which comprises surface regions 25a, 25b arranged obliquely relative to one another. As is clear from FIG. 2A, the course of the cohesive surface 25 repeatedly crosses the main axis H, here for example six times. The main axis H runs roughly centrally through all the surface regions 25a, 25b.

As FIG. 2D shows, the insert body 18 is arranged in such a way within the honeycomb cell 16 that each hexagonal body portion 23 rests with its edges or narrow sides against the walls 17 of the honeycomb cell 16 or terminates flush therewith. In the plan view shown in FIG. 2C, the insert body 18 thus has the outline along its main axis H which corresponds to the cross-section of honeycomb cell 16. The respective quadrangular body portion 24 in this case runs along the corresponding wall 17 and lies flat thereagainst. The insert body 18 is adhesively bonded to the walls 17 of the honeycomb cell 16 by way of the quadrangular body portions 24 and the narrow sides 27 of the hexagonal body portions 23. Further body portions similar to the body portions 24 may be located on a plurality or all of the narrow sides 27 of the insert body 18, so as to achieve better all-round adhesive bonding to the walls 17 of the honeycomb cell 16. The honeycomb cell 16 is thus subdivided by the insert body 18 into a plurality of cavities 29 or subvolumes. The cavities 29 are joined together by passage openings 26, which are provided in the hexagonal body portions 23. The passage openings 26 illustrated in FIGS. 2B-2E are round, but they can have any desired shape, for example they can be slot-shaped. The mutually facing surface regions 25a, 25b, together with the edges of the passage openings 26 and the inner surfaces of the honeycomb walls 17, demarcate a passage 20 for sound waves within the honeycomb cell 16. The sound waves are guided by the insert body 18 within the honeycomb cell 16 from one cavity 29 to another and pass through the corresponding cavity 29 between the in each case two mutually facing surface regions 25a, 25b of the cohesive surface 25 from one passage opening 26 to another. The sound wave thus does not cross the cell volume of the honeycomb cell 16 in a linear manner from the perforated facesheet 12 to the facesheet 14, but is instead guided along the cohesive surface 25 on a winding or zigzag path, which likewise repeatedly crosses the main axis H.

The cohesive surface 25 of the three-dimensional insert body 18 is geometrically a "developable" ruled surface, and may be developed onto a plane such as for example the plane in FIG. 2E without distortion.

The insert body 18 is preferably produced in one piece and of a uniform material. One possible method for producing the insert body 18 is folding from a flat shape (FIG. 2E).

FIG. 2F shows a schematic diagram of a further exemplary embodiment of a flat shape 18' with a cohesive surface, in which the hexagonal body portions 23 are in each case rotated by 60° relative to one another in the plane of FIG. 2F.

The shape 18' can be folded into a three-dimensional insert body (not shown) in which the course of the cohesive surface both repeatedly crosses the main axis and encircles it.

The fold lines 28 are shown by broken lines in FIGS. 2E-2F. An example of a suitable material for folding is PAA anodized aluminum foil, alloy 5052, thickness 25 micrometers (for a honeycomb with a 9.9 mm cell diameter) treated with the anticorrosion agent EC 800. The foil is cut to the basic shape in FIG. 2E for example by an ultrasound cutting installation with cutting blade. The foil may be perforated to obtain the passage openings 26. Predetermined fold lines 28 are preferably introduced into the foil with a stamping tool. The insert body 18 is then folded manually or automatically.

The folded insert body is inserted into the honeycomb cell 16 and adhesively bonded to the walls 17 of the honeycomb cell 16.

The adhesive for adhesively bonding the insert body 18 is selected as a function of the expected operating temperature of the composite component. For required operating temperatures of from 90° to 200° C., the liquid epoxy adhesive EC 690 or EC 662 of the applicant may be used, for example. Adhesives based on bismaleimide (BMI) are advantageous for the temperature range from 200° C. to 400° C., as are adhesives based on polyimide and cyanate esters, optionally in combination with epoxy adhesives.

Further possible materials suitable for producing the insert body 18 by folding are Nomex® and Kevlar® papers, such as for example N636 paper (DuPont) in thicknesses of 1.1; 1.4; 1.8; 2.8; 3.9 mil or Nomex® T412 paper in thicknesses of 1.5; 2; 2.5; 3; 4 mil (1 mil corresponds to 0.0254 mm).

The insert body 18 may furthermore be folded from thermoplastic films, such as for example films of polyetherimide (PEI), for example Ultem® film 1000B, 25-50 μm or Ultem® film UTF120, 4 to 10 μm thickness (Salbic, Tekra);

polyimide (PI), 25 to 127 μm, such as for example Kapton® B or Kapton® FPC for elevated adhesive strength or Kapton® HN for a wide temperature range from −269° C. to 400° C. (DuPont); and polyetherether ketone (PEEK) such as APTIV® films 1000, 1100, 1300, 2000, 2100 series in thicknesses of 6 to 750 μm, preferably 8 to 100 μm (Victrex).

The insert body 18 may however also be produced in the necessary 3D geometry using an additive manufacturing process such as 3D printing.

Figures 5A, 5B, 5C, 5D, 6A, 6B, 6C, 6D, 7:
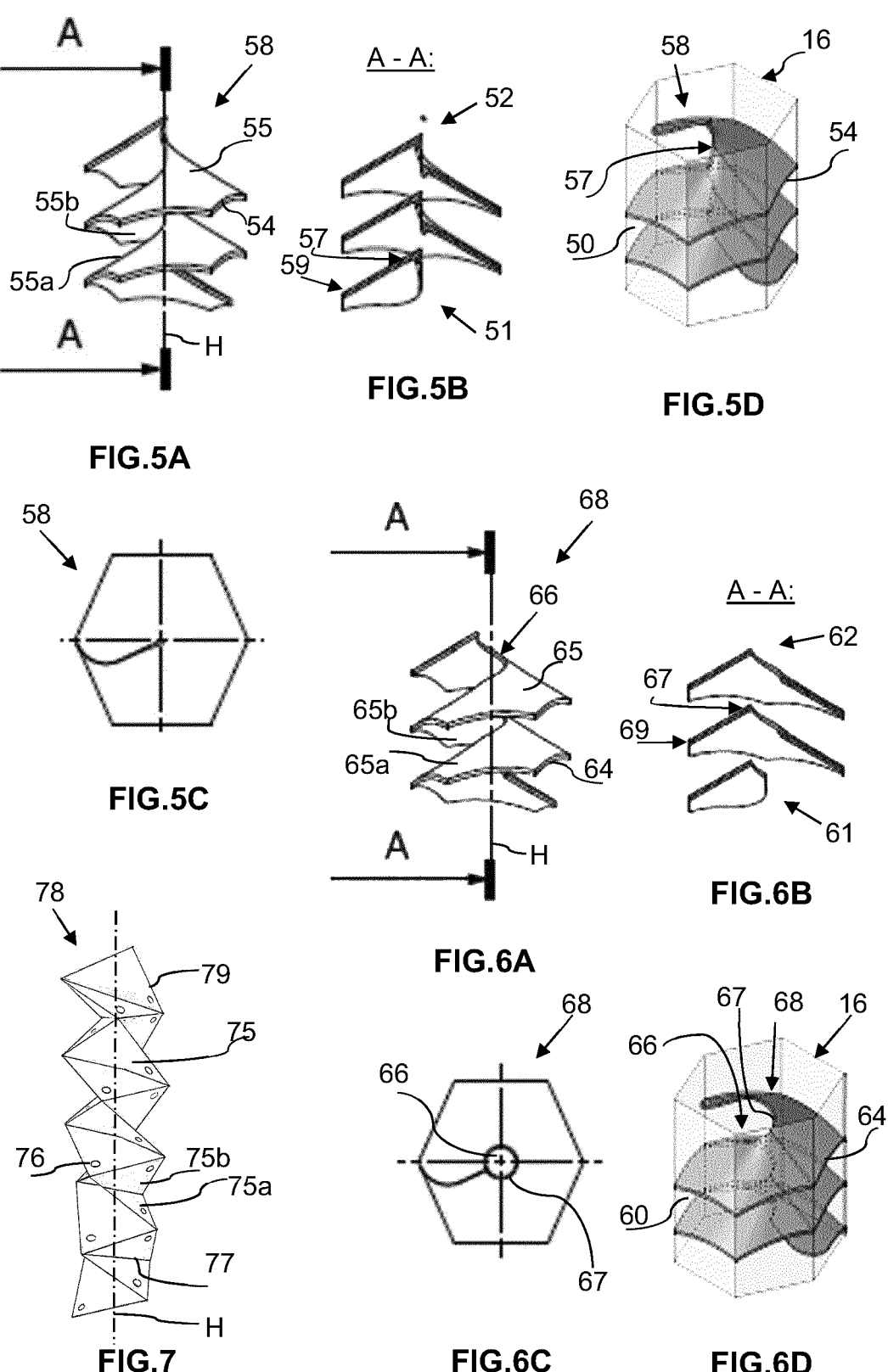
FIGS. 5A-5D: show a further exemplary embodiment of an acoustic insert body for the composite component according to FIG. 1A, with a generalized helicoid and a self-supporting radially inner edge, in front view (FIG. 5A), in longitudinal section (FIG. 5B), in plan view (FIG. 5C), and in perspective view within a honeycomb cell (FIG. 5D)
FIGS. 6A-6D: show a further exemplary embodiment of an acoustic insert body for the composite component according to FIG. 1A, with a generalized helicoid and a continuous free space around the main axis, in front view (FIG. 6A), in longitudinal section (FIG. 6B), in plan view (FIG. 6C), and in perspective view within a honeycomb cell (FIG. 6D)
FIG. 7: shows a further exemplary embodiment of an acoustic insert body for the composite component according to FIG. 1A, with surface regions extending obliquely to one another in partial view.

FIG. 7 shows a further exemplary embodiment of an insert body 78 in partial view with a cohesive surface 75 and mutually facing surface regions 75a, 75b which extend obliquely to one another and obliquely to the main axis H. The insert body 78 may be produced by folding together two narrow strips, which are laid crosswise over one another and folded back alternately over one another, and is suitable in particular for honeycomb cells of square cross-section. The insert body 78 may, however, also be produced by 3D printing. When the insert body 78 is inserted into a honeycomb cell (not shown), the outer edges 79 of the strips and the folded edges 77 are adhesively bonded to the inner surfaces of the honeycomb walls, such that the honeycomb cell is subdivided into cavities, wherein the mutually facing surface regions 75a, 75b and the inner surface of the honeycomb walls demarcate cavities. The insert body 78 may have passage openings (not shown), which specify a zigzag path for sound waves. Alternatively or in addition, the insert body 78 may be made from an open-pore material.

FIGS. 3A-6D show further exemplary embodiments in which one-part insert bodies 38; 48; 58; 68 are provided with sound-conducting surfaces configured according to the invention. In FIGS. 3A-6D, the continuous surface is substantially a generalized helicoid 35; 45; 55; 65.

According to a further exemplary embodiment in FIGS. 3A-3C, the insert body 38 has a central trunk 36 extending along the main axis H. The main axis H runs through the trunk 36. The insert body 38 further comprises a peripheral helical or spiral part in the form of a strip 33 winding around the trunk 36 and having or forming a cohesive generalized helicoid 35. The helical strip 33 preferably forms multiple turns about the trunk 36 or the main axis H, in the present example around 2.5 turns. In plan view along the main axis H, the insert body 38 has a hexagonal outline (FIG. 3C), which corresponds to the cross-section of the honeycomb cell 16.

FIG. 3D shows the insert body 38 in its proper position within a honeycomb cell 16, which is depicted individually here for the sake of clarity. The radially outer edge 34 of the strip 33 terminates flush with the walls 17 of the honeycomb cell 16 or is in contact with the honeycomb walls 17 along its length. Between the turns of the insert body 38, the passage 30 for the sound waves is demarcated in the axial direction or direction of the main axis H by the mutually facing surface regions 35a, 35b of the generalized helicoid 35. In the radial direction, the passage 30 is demarcated by the surface of the trunk 36 and the inner surface of the honeycomb walls 17.

In the present example, the generalized helicoid 35 is a developable ruled surface. The longitudinal ends of the elongate trunk 36 constitute the first end 31 and the second end 32 of the insert body 38 and, within the finished composite component 1, are in contact with the facesheets 12, 14.

The generalized helicoid 35 is delimited in the radial direction by a radially inner edge 37 and a radially outer edge 39. The radially outer edge 39 adjoins the edge 34 or narrow side of the strip 33 resting against the honeycomb walls 17. The radially inner edge 37 adjoins the trunk 36. The trunk 36 bears the inner edge 37 of the generalized helicoid 35. The generalized helicoid 35 merges into the surface of the trunk 36.

According to a further exemplary embodiment in FIGS. 4A-4B, the insert body 48 differs from the insert body 38 in FIGS. 3A-3D merely in that it has a generalized helicoid 45 which is not a ruled surface but rather displays concavo-convex curvature. The passage 40 for the sound waves is demarcated in the axial direction by the convex surface regions 45a and the concave surface regions 45b of the generalized helicoid 45.

According to a further exemplary embodiment in FIGS. 5A-5B, the insert body 58 differs from the insert body 38 in FIGS. 3A-3D merely in that the insert body 58 has no central trunk. The radially inner edge 57 of the generalized helicoid 55 is completely self-supporting or self-supporting over its entire length.

According to a further exemplary embodiment in FIGS. 6A-6B, the insert body 68 differs from the insert body 38 in FIGS. 3A-3D merely in that a free space 66 is provided instead of the central trunk 36, said free space 66 extending in the manner of a column along the main axis or helicoid axis. The radially inner edge 67 of the generalized helicoid 65 is here completely self-supporting. As can be seen in FIGS. 6C and 6D, in plan view the insert body 68 does not cover the complete cross-section of the honeycomb cell 16. A central opening remains, which is delimited in plan view by the radially inner edge 67 of the generalized helicoid 65. During subsequent shaping of the honeycomb 10 equipped with the insert bodies 68, this opening may close on the side of the honeycomb 10 facing the bending axis U (cf. (FIG. 1C) and open wider on the side remote from the bending axis U. In this way, the free space 66 makes the honeycomb 10 particularly readily shapable.

FIGS. 8A-8D show the insert body 88 according to a further exemplary embodiment and comprising four hollow, nested pyramidal or funnel-shaped body portions 83, which are arranged coaxially with the main axis H and with one another and are joined together by a connecting portion in the form of a central trunk 86. The main axis H runs through the trunk 86. Together with the trunk 86, the body portions 83 form a cohesive surface 85 which extends continuously from the first end 81 to the second end 82 of the insert body 88. The insert body 88 may be arranged with both its first end 81 and its second end 82 facing the sound source.

The connecting portion may also have a different shape from that depicted and be arranged non-centrally. The insert body 88 may have a plurality of non-central, in particular peripheral connecting portions, which run parallel to or transversely of the main axis H and may join the pyramidal body portions 83 together. The pyramidal body portions 83 may for example be enclosed in a "pre-cell", which is part of the insert body 88. The shape of the pre-cell here corresponds to the shape of the honeycomb cell 16 in which the insert body 88 is to be inserted. The walls of the pre-cell may not be complete, so as to save weight (not shown).

In plan view along the main axis H, the insert body 88 has a hexagonal outline (FIG. 8C), which corresponds to the cross-section of the honeycomb cell 16. The insert body 88 additionally has fastening portions 84, which are in each case joined to a pyramidal body portion 83 and run parallel to the main axis H. If the insert body 88 is properly accommodated in a honeycomb cell 16, the fastening portions 84 in each case rest flat against the honeycomb walls 17 and may thus be adhesively bonded all round. Between the pyramidal body portions 83 of the insert body 88, the passage 80 for the sound waves is demarcated in the direction of the main axis H by the mutually facing surface regions 85*a*, 85*b*.

Figure 8A:
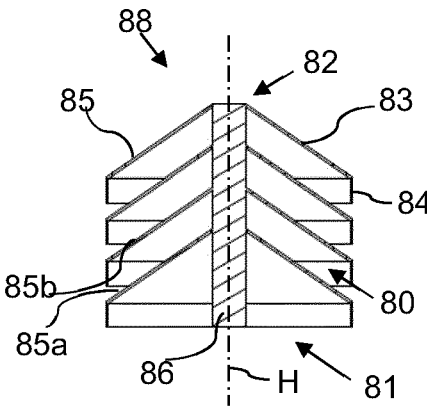
FIGS. 8A-8E: show a further exemplary embodiment of an acoustic insert body for the composite component according to FIG. 1A, with a plurality of pyramidal body portions, in longitudinal section (FIG. 8A), in a view from below along the main axis H (FIG. 8B), in plan view (FIG. 8C), and in perspective view from below (FIG. 8D); and a schematic diagram of a further variant (FIG. 8E).
Figure 8B:
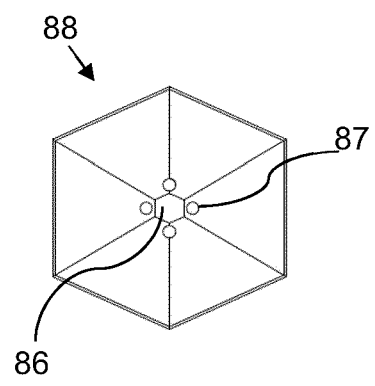
Figure 8C:
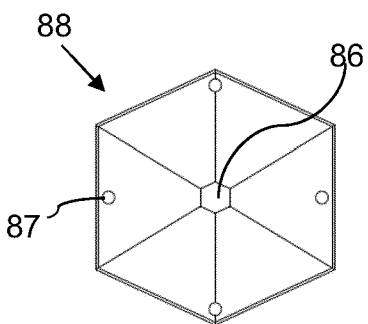
Figure 8D:
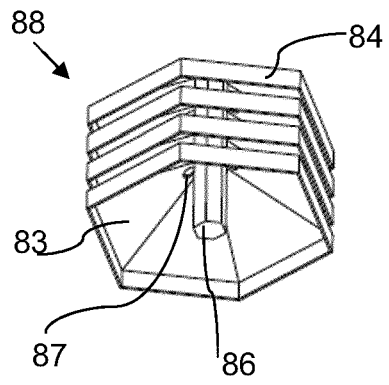
Figure 8E:
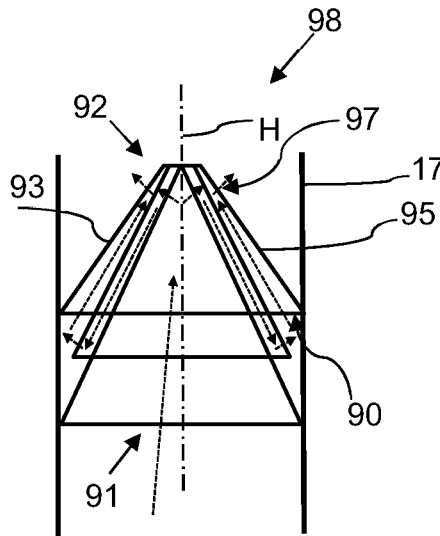

The successive pyramidal body portions 83 have passage openings 87 alternately either in the middle region or at the periphery thereof, as is shown in FIGS. 8B and 8C. The honeycomb cell 16 may thus be subdivided by the insert body 88 into multiple cavities, which are separated from one another by the pyramidal body portions 83, wherein the passage openings 87 allow the sound waves to propagate on a zigzag path. FIG. 8E shows a variant of the insert body 98 in a honeycomb cell. The flow of the sound waves is indicated by broken lines. The insert body 98 has no central trunk; the pyramidal body portions 93 are bonded together by their tips, such that they form a cohesive surface 95. This variant otherwise corresponds substantially to the exemplary embodiment in FIGS. 8A-8D. If the insert body 88, 98 is oriented with its first, wider end 81, 91 toward the source of the sound waves, it may be considered as the opposite of a megaphone, which not only attenuates the sound waves but also optionally increases their frequency.

The insert bodies 38, 48, 58 and 68 in FIGS. 3 to 6 may be produced from plastics or metal by 3D printing. One exemplary embodiment uses an aluminum powder alloy AlSi10 Mg, grain size 90 μm, and an EOS M 290 3D printer to produce the insert body 38; 48; 58; 68. One exemplary embodiment uses a titanium powder alloy Ti64, grain size 63 μm, and an EOS M 100 3D printer. Another exemplary embodiment uses Ultem 9085 polyetherimide (PEI) filament, 1.75 mm and the Stratasys F900 system. A further exemplary embodiment uses 1.75 mm 3DXTECH polyetherether ketone (PEEK) filament and the Stratasys Fortus 450 mc system.

Other production methods, in particular those which are not AM processes, for example the production of comparatively inexpensive die-cast parts or injection molded parts or the like, or for example the use of folding techniques, also fall within the scope of the invention.

LIST OF REFERENCE SIGNS

FIGS. 1A-1C
  1 Composite component
  10 Honeycomb
  12 Outer facesheet
  14 Inner facesheet
  16 Honeycomb cell
  17 Wall of the honeycomb cell
  18 Insert body
  R Radius of curvature
  U Theoretical bending axis
  T Depth of the honeycomb cells
FIGS. 2A-2F:
  16 Honeycomb cell
  17 Wall of the honeycomb cell
  18; 18' Insert body
  20 Passage for sound waves
  21 First end of the insert body
  22 Second end of the insert body
  23 Hexagonal body portion
  24 Quadrangular body portion
  25 Cohesive surface
  25*a*, 25*b* Surface regions
  26 Passage opening
  27 Narrow side of the hexagonal body portion
  28 Fold line
  29 Cavity
  α Angle between body portions
  H Main axis of the insert body
FIGS. 3A-6D:
  16 Honeycomb cell
  17 Wall of the honeycomb cell
  30; 40; 50; 60 Passage for sound waves
  31; 41; 51; 61 First end of the insert body
  32; 42; 52; 62 Second end of the insert body
  33 Strip
  34; 44; 54; 64 Edge of the strip
  35; 45; 55; 65 Generalized helicoid
  35*a*, 35*b*; 45*a*, 45*b*;
  55*a*, 55*b*; 65*a*, 65*b* Surface regions
  36; 46 Trunk
  37; 47; 57; 67 Radially inner edge
  38; 48; 58; 68 Insert body
  39; 49; 59; 69 Radially outer edge
  66 Free space
  H Main axis of the insert body
FIGS. 7-8:
  17 Wall of the honeycomb cell
  29 Cavity
  80 90 Passage for sound waves
  81; 91 First end of the insert body
  82; 92 Second end of the insert body
  83; 93 Pyramidal body portion
  84 Fastening portion
  75; 85; 95 Cohesive surface 75*a*. 75*b*; 85*a*. 85*b*;
95*a*, 95*b* Surface regions
76 Passage opening
86 Trunk
87.97 Passage opening
77 Folded edge
78; 88; 98 Insert body
79 Edge
H Main axis of the insert body

What is claimed is:

1. An acoustic insert body for a honeycomb for attenuating sound waves, comprising:
   the insert body having a main axis and being insertable into a honeycomb cell such that the main axis runs in a depth direction of the honeycomb cell, and
   the insert body comprising a cohesive surface, and, relative to the direction of the main axis, a first end and a second end,
   wherein the cohesive surface of the insert body has surface regions, spaced from one another in the direction of the main axis, which face one another and overlap in a projection onto a plane lying perpendicular to the main axis in order to demarcate a passage for sound waves between the surface regions in the direction of the main axis,
   a course of the cohesive surface from the first end, through the surface regions and to the second end encircling and/or repeatedly crossing the main axis.

2. The acoustic insert body according to claim 1, wherein, in the projection onto the plane lying perpendicular to the main axis, the cohesive surface covers a cross-section of the honeycomb cell into which the insert body is insertable or inserted.

3. The acoustic insert body according to claim 1, wherein the insert body has a trunk which extends continuously in the direction of the main axis.

4. The acoustic insert body according to claim 1, wherein the cohesive surface comprises a generalized helicoid and/or a developable surface.

5. The acoustic insert body according to claim 4, wherein the generalized helicoid has a helicoid axis which runs in the direction of the main axis of the insert body, the generalized helicoid having a radially inner edge and a radially outer edge.

6. The acoustic insert body according to claim 5, wherein the radially inner edge is borne by a trunk of the insert body.

7. The acoustic insert body according to claim 5, wherein the radially inner edge is self-supporting.

8. The acoustic insert body according to claim 1, wherein the course of the cohesive surface encircles the main axis at least over 360°.

9. The acoustic insert body according to claim 1, wherein the insert body is configured to subdivide the honeycomb cell into cavities, such that the cohesive surface delimits the cavities such that in each case two cavities are connected together in acoustically transmissive manner.

10. The acoustic insert body according to claim 1, wherein at least some surface regions run obliquely to the direction of the main axis.

11. A composite component for attenuating sound waves, comprising at least one honeycomb with honeycomb cells and with a number of acoustic insert bodies, in each case at least one insert body according to claim 1 being arranged in at least some honeycomb cells,
   the insert body being arranged in a respective honeycomb cell such that the main axis runs in the depth direction of the honeycomb cell.

12. The composite component according to claim 11, the insert body subdividing the honeycomb cell into a plurality of cavities which are demarcated in the direction of the main axis by the mutually facing surface regions.

13. The composite component according to claim 11, comprising at least one facesheet and/or intermediate sheet, which is joined to the honeycomb,
   the facesheet and/or intermediate sheet being made from plastics, composite material, metal, and/or ceramics; and/or
   the honeycomb being made from plastics, composite material, metal, or ceramics; and/or
   the insert body being adhesively bonded and/or being joined in bonded manner to adjoining walls of the respective honeycomb cell and/or to the facesheet or intermediate sheet.

14. An acoustic insert body for a honeycomb for attenuating sound waves, comprising:
   the insert body having a main axis and being insertable into a honeycomb cell such that the main axis runs in a depth direction of the honeycomb cell, and
   the insert body comprising a cohesive surface, and, relative to the direction of the main axis, a first end and a second end,
   wherein the cohesive surface of the insert body has surface regions, spaced from one another in the direction of the main axis, which face one another and overlap in a projection onto a plane lying perpendicular to the main axis in order to demarcate a passage for sound waves between the surface regions in the direction of the main axis and to subdivide the honeycomb cell into a plurality of cavities which are demarcated in the direction of the main axis by the mutually facing surface regions.

15. The acoustic insert body according to claim 14, wherein the insert body has at least two pyramidal or funnel-shaped body portions for subdividing the honeycomb cell into cavities, the pyramidal or funnel-shaped body portions being arranged offset relative to one another in the direction of the main axis and providing the mutually facing surface regions.

16. The acoustic insert body according to claim 15, wherein the pyramidal or funnel-shaped body portions are joined together by at least one connecting portion with the at least one connecting portion being a centrally arranged trunk extending in the direction of the main axis.

17. The acoustic insert body according to claim 14, wherein the cohesive surface of the insert body comprises a ruled surface, and/or the cohesive surface of the insert body has convex and/or concave surface regions of the surface regions.

18. The acoustic insert body according to claim 14, wherein the cohesive surface of the insert body comprises a stepped and/or corrugated surface.

19. The acoustic insert body according to claim 14, wherein the insert body is made in one piece and/or of a uniform material.

20. The acoustic insert body according to claim 14, wherein the insert body is produced using an additive manufacturing process, or the insert body is produced using a folding and/or stamping technique.

21. The acoustic insert body according to claim 14, wherein the cohesive surface is formed at least in part by a strip of plastics material and/or from a fibrous material, and/or from metal.

22. The acoustic insert body according to claim 14, wherein the insert body comprises an air-permeable material.

23. A method for producing a composite component for attenuating sound waves, the method comprising:

providing a honeycomb, inserting an acoustic insert body into a honeycomb cell of the honeycomb, producing the insert body using an additive manufacturing process, such that the insert body has a cohesive surface, and wherein the cohesive surface of the insert body has surface regions, spaced from one another in a direction of a main axis of the insert body, which face one another and overlap in a projection onto a plane lying perpendicular to the main axis in order to demarcate a passage for sound waves between the surface regions in the direction of the main axis, a course of the cohesive surface from a first end of the insert body, through the surface regions and to a second end of the insert body encircling and/or repeatedly crossing the main axis.

24. The method according to claim 23, wherein providing the honeycomb and inserting acoustic insert bodies into honeycomb cells of the honeycomb is carried out in one step using the additive manufacturing process.

25. The method according to claim 23, wherein the additive manufacturing process is a 3D printing process.

26. The method according to claim 23, wherein the insert body is adhesively bonded and/or joined in bonded manner to adjoining walls of the respective honeycomb cell and/or to a facesheet or intermediate sheet.

\* \* \* \* \*